United States Patent
Schwerdt, Sr.

(10) Patent No.: US 11,649,601 B2
(45) Date of Patent: May 16, 2023

(54) METHOD AND APPARATUS FOR INSTALLING END SEALS

(71) Applicant: INA ACQUISITION CORP., Wilmington, DE (US)

(72) Inventor: Bradley Schwerdt, Sr., St. Peters, MO (US)

(73) Assignee: INA Acquisition Corp., Wilmington, DE (US)

( * ) Notice: Subject to any disclaimer, the term of this patent is extended or adjusted under 35 U.S.C. 154(b) by 262 days.

(21) Appl. No.: 16/843,472

(22) Filed: Apr. 8, 2020

(65) Prior Publication Data
US 2021/0317626 A1 Oct. 14, 2021

(51) Int. Cl.
| | | |
|---|---|---|
| *E02B 3/16* | (2006.01) | |
| *F16L 5/02* | (2006.01) | |
| *E02D 29/12* | (2006.01) | |

(52) U.S. Cl.
CPC ............... *E02B 3/16* (2013.01); *E02D 29/12* (2013.01); *F16L 5/02* (2013.01)

(58) Field of Classification Search
CPC ... E02B 3/16; F16L 5/02; F16L 55/163; F16L 55/18; F16L 41/088; E02D 29/12; B25B 27/0028
See application file for complete search history.

(56) References Cited

U.S. PATENT DOCUMENTS

| | | | | |
|---|---|---|---|---|
| 4,203,190 A | * | 5/1980 | Temple | F16L 41/088 29/451 |
| 4,370,113 A | * | 1/1983 | Nakashin | F16L 55/18 425/13 |
| 8,240,340 B2 | | 8/2012 | Kiest, Jr. | |
| 8,240,341 B2 | | 8/2012 | Kiest, Jr. | |
| 8,561,145 B2 | | 10/2013 | Lim et al. | |
| 8,567,451 B2 | | 10/2013 | Kiest, Jr. | |
| 8,636,036 B2 | | 1/2014 | Kiest, Jr. | |
| 8,640,737 B2 | | 2/2014 | Kiest, Jr. | |
| 2014/0102576 A1 | * | 4/2014 | Kiest, Jr. | F16L 55/1651 138/98 |
| 2015/0345686 A1 | * | 12/2015 | Kiest, Jr. | F16L 55/1651 138/97 |
| 2016/0053456 A1 | * | 2/2016 | Kiest, Jr. | F16L 55/163 405/150.1 |
| 2019/0113168 A1 | * | 4/2019 | Kiest, Jr. | F16L 55/179 |

OTHER PUBLICATIONS

LMK Technologies Manual Installation Practice for Insignia Hydrophilic End Seal Sleeve, pp. 1-4, at least as early as Dec. 12, 2019.
LMK Technologies Installation Manual Insignia Hydrophilic End Seal, Revised Feb. 12, 2014, pp. 1-3.

* cited by examiner

*Primary Examiner* — Carib A Oquendo
(74) *Attorney, Agent, or Firm* — Stinson LLP

(57) ABSTRACT

An end seal placement tool for placing an end seal in a host pipe within a manhole includes a pole with opposite proximal and distal ends. An end seal holder is disposed at the distal end of the pole. The end seal holder includes an end seal chamber configured to hold the end seal. The end seal holder is sized and shaped to be at least partially inserted into the host pipe. A launcher is arranged with respect to the end seal holder for ejecting the end seal from the end seal holder into the host pipe.

20 Claims, 4 Drawing Sheets

METHOD AND APPARATUS FOR INSTALLING END SEALS

FIELD

The present disclosure generally relates to an apparatus and method for installing cured-in-place pipes (CIPP) and more specifically to an apparatus and method for installing end seals in a host pipe.

BACKGROUND

Over time or because of a particular event or condition (e.g., seismic activity, exposure to excessive or uneven loads or moments, poor compaction, crown corrosion, corrosive soil, etc.), the structural integrity or capacity of force mains, other pipes, and like structures may diminish. For example, such items may crack, corrode, deteriorate, and the like. Different methods of repairing or otherwise strengthening damaged pipes and other items are known. For example, in cured-in-place pipe applications (CIPP applications), liners impregnated with a curable resin or epoxy are positioned within a host pipe, and allowed to cure, thereby forming a barrier between the host pipe and the pipe interior. End seals are positioned at the ends of the liner and disposed between the host pipe and liner to form a water tight seal between the two. The seal is provided so that liquid cannot get between the liner and the host pipe at the end of the liner. Conventional end seals include a cylindrical hydrophilic material and a retaining ring (e.g., metal coil or spring) that pushes the cylindrical hydrophilic material outward into engagement with the interior of the host pipe. The retaining ring holds the end seal in position on the host pipe while the liner is installed and during use. In use, any fluid that flows between the liner and host pipe causes the hydrophilic material to swell and form a water-tight seal between the liner and host pipe.

End seals are positioned in the host pipe before the liner is installed. Typically, a person has to enter a manhole to access the host pipe and manually position the end seal in the host pipe.

SUMMARY

In one aspect, an end seal placement tool for placing an end seal in a host pipe within a manhole comprises a pole with opposite proximal and distal ends. An end seal holder is disposed at the distal end of the pole. The end seal holder includes an end seal chamber configured to hold the end seal. The end seal holder is sized and shaped to be at least partially inserted into the host pipe. A launcher is arranged with respect to the end seal holder for ejecting the end seal from the end seal holder into the host pipe.

In another aspect, a method of placing an end seal in a host pipe within a manhole comprises opening the manhole to gain access to the host pipe located within the manhole and positioning the end seal within the host pipe from a location outside of the manhole.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
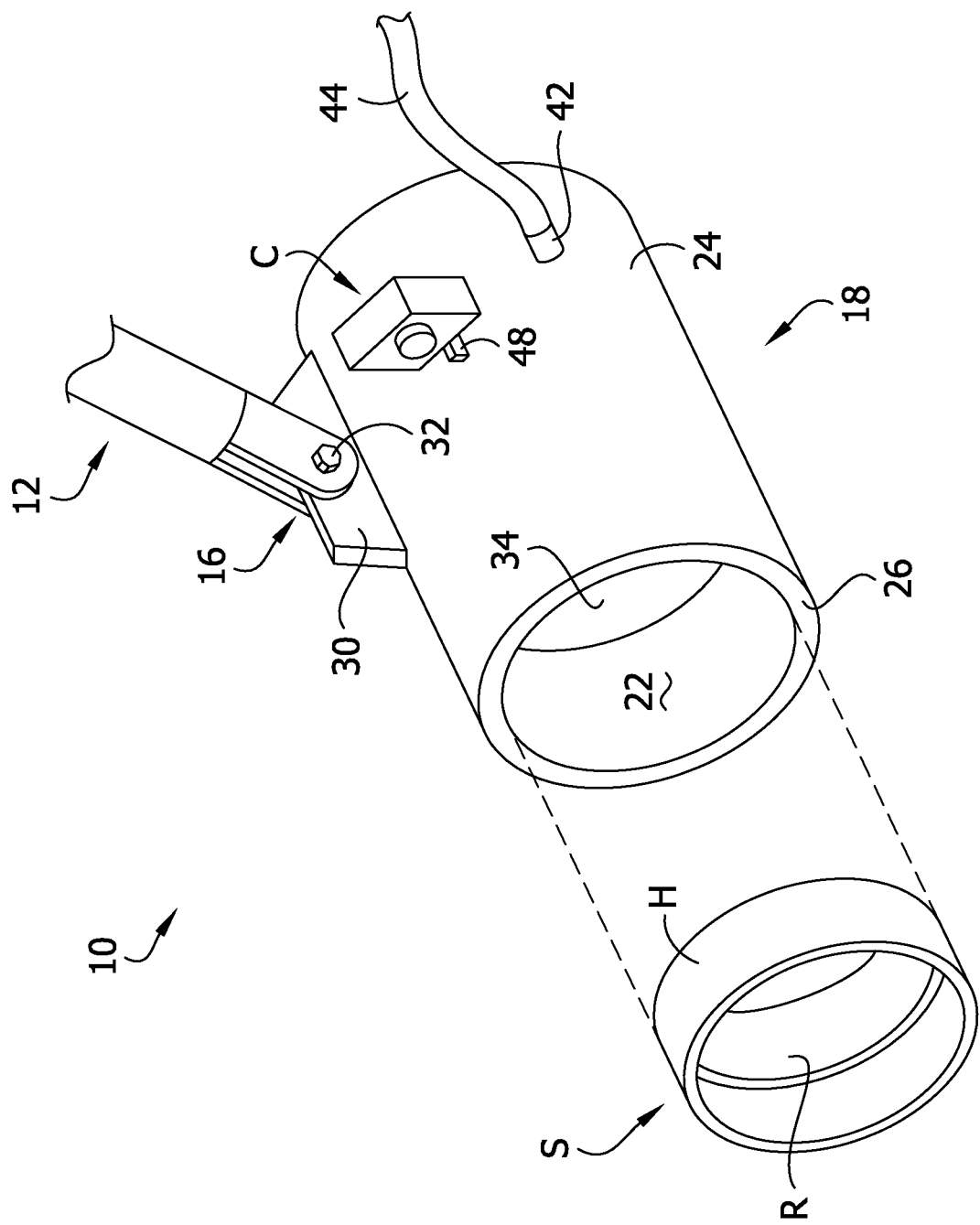
FIG. 1 is a perspective of an end seal holder of an end seal placement tool according to one embodiment of the present disclosure.
Figure 2:
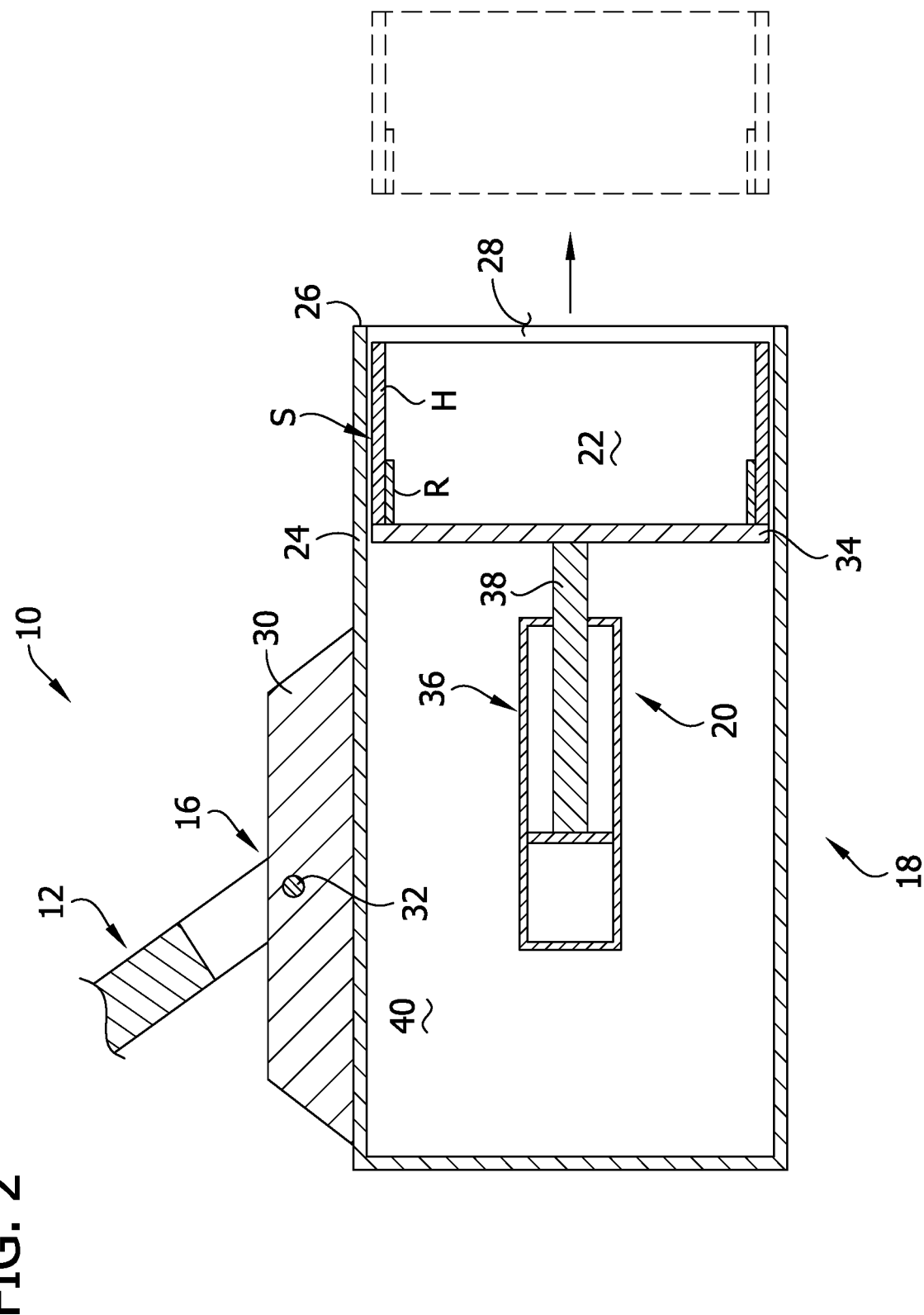
FIG. 2 is a cross-section of the end seal holder of the end seal placement tool.
Figure 3:
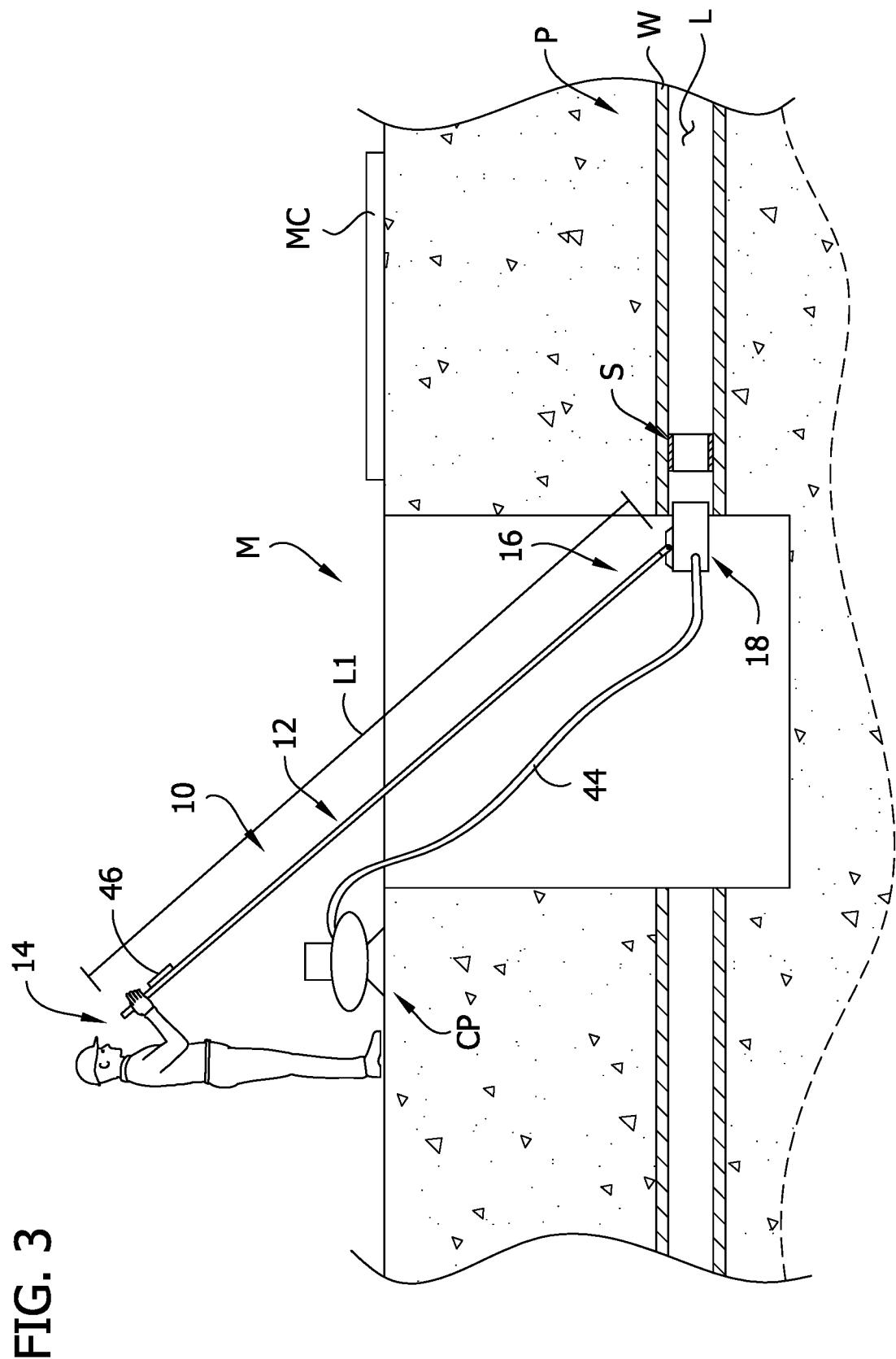
FIG. 3 is a schematic elevation of a manhole with a manhole cover removed and a person using the end seal placement tool to position an end seal in a host pipe within the manhole.

Referring to FIGS. 1-3, an end seal placement tool for placing an end seal S in a host pipe P is generally indicated by reference numeral 10. The host pipe P needs lining (not shown) and, accordingly, an end seal S must be placed at the end of the host pipe before it is lined to form a fluid tight seal between the host pipe and lining. In the illustrated context, the host pipe P is underground and is located within and accessible through a manhole M (FIG. 3). However, it is understood the end seal placement tool 10 can be used with host pipes used in other contexts, such a host pipes above ground. The host pipe P has a wall W that defines an interior lumen L. The host pipe P may be of generally any size, such as an eight inch (20 cm) or a ten inch (25 cm) host pipe. Other sizes of host pipes P may be used without departing from the scope of the disclosure. Generally, the wall W of the host pipe P has deteriorated such that it may be unfit to carry fluid and, accordingly, is in need of lining. The end seal placement tool 10 enables a person or worker to place an end seal S in the host pipe P from a position outside the manhole M before the lining is installed within the lumen L. Thus, the end seal placement tool 10 allows a person to place the end seal S in the host pipe P without requiring the person to enter the manhole M. In the illustrated embodiment, the end seal S includes a cylindrical hydrophilic material H and a retaining ring R, although the use of end seals with other configurations is within the scope of the present disclosure. For example, the end seal S may not include the retaining ring R.

The end seal placement tool 10 includes a pole 12 with opposite proximal and distal ends 14 and 16. The pole 12 has a length Li extending between the proximal and distal ends 14, 16. The end seal placement tool 10 includes an end seal holder 18 disposed at (e.g., proximate to) the distal end 16 of the pole 12. As described in more detail below, the end seal holder 18 is configured to hold the end seal S to be placed in the host pipe P. The end seal placement tool 10 also includes a launcher 20 (FIG. 2) configured to eject the end seal S from the end seal holder 18 into the host pipe P. As shown in FIG. 3, the length Li of the pole 12 is large enough to permit a person standing adjacent to the manhole M to hold the pole while positioning the end seal holder 18 and launcher 20 adjacent to the host pipe P within the manhole. This allows the person to install the end seal S in the host pipe P without having to enter the manhole M, as described in more detail below. In one embodiment, the pole 12 may have an adjustable length Li. For example, the pole 12 can be comprised of two or more telescoping pieces (not shown) that can move and be secured in different positions relative to one another to adjust the length Li of the pole.

Referring to FIGS. 1 and 2, the end seal holder 18 includes an end seal chamber 22 configured to hold the end seal S. In the illustrated embodiment, the end seal chamber 22 has a generally cylindrical tubular shape. The end seal holder 18 includes a generally cylindrical exterior wall 24 that defines the end seal chamber 22. A distal end 26 of the exterior wall 24 defines an end seal opening 28. The end seal opening 28 is in communication with and defines the distal end of the end seal chamber 22. As described in more detail below, the end seal S is loaded into and dispensed from the end seal holder 18 by moving the end seal through the end seal opening 28. The end seal holder 18 is sized and shaped to be at least partially inserted into the host pipe P, as shown in FIG. 3. In particular, the distal end 26 of the exterior wall 24 is sized and shaped to be inserted into the host pipe P. The exterior surface of the end seal holder 18 (e.g., exterior wall 24) has a generally circular cross-sectional shape to match the cross-sectional shape of the lumen L. The diameter of the exterior wall 24 is less than the diameter of the lumen L of the host pipe P to allow the end seal holder 18 to be inserted into the lumen. For example, in one embodiment the outer diameter of the exterior wall 24 may be about 7.75 inches (19.5 cm) so the exterior wall can fit into the lumen L of an 8 in (20 cm) host pipe P.

In the illustrated embodiment, the end seal holder 18 is pivotably attached to the pole 12. The end seal holder 18 includes an attachment flange 30 connected to the exterior wall 24 and coupled to the distal end 16 of the pole 12 with a fastener 32. The fastener 32 extends through aligned openings in the attachment flange 30 and pole 12, to pivotably attach the pole to the end seal holder 18. In addition, the attachment flange 30 may also function as stop that engages the end of the host pipe P to limit or set the distance the end seal holder 18 is inserted into the host pipe P.

The launcher 20 is arranged with respect to the end seal holder 18 for launching or ejecting the end seal S from the end seal holder into the host pipe P. In particular, the launcher 20 is configured to launch the end seal S from the end seal holder 18 (e.g., end seal chamber 22) by moving the end seal through the end seal opening 28 and into the host pipe P. The launcher 20 includes a push plate 34 and a linear actuator 36 operatively coupled to the push plate 34. The linear actuator 36 drives movement of the push plate to launch the end seal S from the end seal holder 18. In the illustrated embodiment, the linear actuator 36 is a pneumatic linear actuator, although other types of actuators capable of driving linear movement are within the scope of the present disclosure. For example and without limitation, the actuator 36 can be an electric linear actuator or a spring (not shown). More than one linear actuator may be used. In the illustrated embodiment, the push plate 34 is attached to an end of a piston 38 of the linear actuator 36. The push plate 34 generally defines the proximal end of the end seal chamber 22. The push plate 34 is generally disk shaped and is in close proximity to or engagement with the interior surface of the exterior wall 24. This ensures the push plate 34 will engage and push the end seal S as the push plate moves through the end seal chamber 22. To launch or eject the end seal S from the end seal chamber 22, the linear actuator 36 moves the push plate 34 distally (e.g., toward the end seal opening 28) to push the end seal S through the end seal opening and out of the end seal holder 18. The linear actuator 36 may move the push plate 34 through the end seal opening 28 and out of the end seal holder 28 to ensure the end seal S is completely disposed in the host pipe P. To reset the push plate 34 after ejecting the end seal S, the linear actuator 36 moves the push plate proximally (e.g., away from the end seal opening 28) back to its initial position, as shown in FIG. 2. In this position, another end seal S can be loaded into or received by the end seal holder 18.

In the illustrated embodiment, the push plate 34 divides the interior of the exterior wall 24 into the end seal chamber 22 and a launcher chamber 40. The linear actuator 36 is disposed in the launcher chamber 40 and is securely coupled to the exterior wall 24. Because the illustrated linear actuator 36 is pneumatic, the illustrated launcher 20 includes a port 42 (broadly, one or more ports) fluidly coupled to the linear actuator and configured to fluidly couple to a fluid supply line 44 (broadly, one or more supply lines) and an accumulator. The accumulator may be mounted on the pole 12 proximate the linear actuator. In the illustrated embodiment, the port 42 is disposed on the exterior wall 24 adjacent the proximal end of the exterior wall, although other configurations are within the scope of the present disclosure. The supply line 44 fluidly couples the linear actuator 36 to a source of pressurized fluid, such as the accumulator. The compressor CP operates to maintain a substantial pressure in the accumulator. The pressurized fluid from the accumulator is used to rapidly drive movement of the piston 38 of the linear actuator 36 and move the push plate 34 proximally and distally. The supply line 44 has a length sufficient to allow the end seal holder 18 and launcher 20 to be inserted into the host pipe P through the manhole M.

The end seal placement tool 10 includes a switch or trigger 46 to operate the launcher 20. The trigger 46 is operatively connected to a valve associated with the accumulator and is configured to activate the linear actuator to launch the end seal S and/or return the push plate 34 to the initial position. The trigger 46 is disposed proximate to the proximal end 14 of the pole 12 in order to be within reach of the person operating the end seal placement tool 10. In the illustrated embodiment, the trigger 46 is operatively connected to the valve for actuating the valve to release high pressure air to the linear actuator 36 to launch the end seal S from the end seal holder 18. Other configurations of the trigger 46 are within the scope of the present disclosure. For example, if the linear actuator 36 is electrically powered, the trigger can control the power to the linear actuator.

The end seal placement tool 10 may also include an accessory or camera mount 48 to attach a camera C to the end seal placement tool 10. The camera C can be used verify the placement of an end seal S in the host pipe P. The camera mount 48 is used to attach the camera C, for example a GoPro® camera, to the end seal placement tool 10. In the illustrated embodiment, the camera mount 48 is mounted on the exterior wall 24 of the end seal holder 18. The camera C may be able to wirelessly transmit the pictures and/or video taken to a user device, such as a computer, cell phone, tablet, etc., to allow the person to view the pictures and/or video in real time. For example, the camera C may be used to take a photograph showing that the end seal S has been installed in the host pipe P. Documentation (e.g., a photograph) of the end seal S in a host pipe P is required in certain jurisdictions. The accessory mount 48 may be used to attach other accessories to the end seal end seal placement tool 10, such as but not limited to a light source, a proximity meter, and/or a second camera. In one embodiment, the end seal placement tool 10 may include multiple accessory mounts (not shown). Other configurations of the accessory mount are within the scope of the present disclosure. The accessory mount 48 can be disposed at generally any position on the end seal holder 18.

Figure 4:
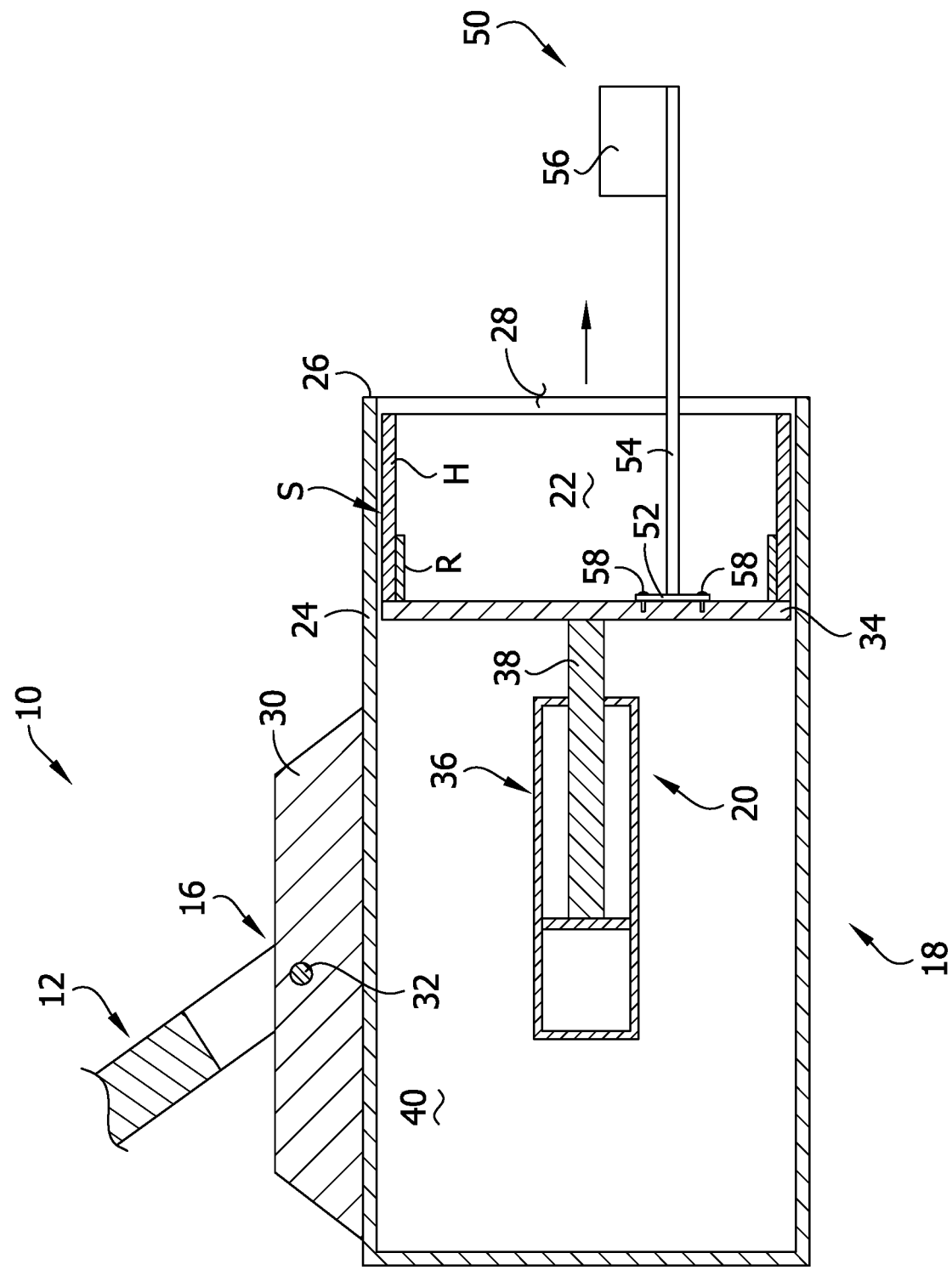
FIG. 4 is a cross-section of the end seal holder with a sensor assembly mounted thereon.

Referring to FIG. 4, in one embodiment, the end seal placement tool 10 may include a pipe measurement assembly 50. The pipe measurement assembly 50 is configured to measure the size of the host pipe P (e.g., the diameter of the lumen L). The pipe measurement assembly 50 includes a mounting plate 52, a sensor support 54 and a distance sensor 56. The mounting plate 52 releasably couples the pipe measurement assembly 50 to the push plate 34 (broadly, the end seal holder 18). Preferably, the mounting plate 52 is coupled to the push plate 34 at a location that is space inward of the outer edge of the push plate. This location of the pipe measurement assembly 50 does not interfere with the end seal S, allowing the end seal placement tool 10 to dispense the end seal when the pipe measurement assembly is attached to the push plate 34. The mounting plate 52 may be coupled to the push plate 34 with fasteners 58 (e.g., screws, bolts, etc.). The mounting plate 52 is connects to one end of the sensor support 54 and the distance sensor 56 is couple to the opposite end of the sensor support. The sensor support 54 may be a rod, channel, bar, flange, etc. The sensor support 54 has a length sufficient to position the distance sensor 56 outside of the end seal chamber 22 in order to enable the distance sensor to measure the host pipe P when the push plate 34 is in the initial position. Accordingly, inserting the end seal holder 18 into the lumen L of the host pipe P inserts the distance sensor 56 into the lumen of the host pipe. The distance sensor 56 takes the measurement of the host pipe P and transmits the measurement to the user device, through a wired or wireless connection. This allows the person to verify the measurement or size of the host pipe P without having to enter the manhole M. The sensor support 54 may be configured to support other accessories, such as the camera C, simultaneously with the distance sensor 56. The mounting plate 52 and sensor support 54 may broadly be considered an accessory mount, similar to accessory mount 48, and may be used to connect other accessories, such as the camera C, to the end seal holder 18. Other configurations of the pipe measurement assembly are within the scope of the present disclosure. For example, instead of the distance sensor, the pipe measurement assembly may include a mechanical measuring device (not shown) (e.g., a ruler, a tape measure, etc.). In this embodiment, the person will move the mechanical measuring device into position relative to the host pipe P (e.g., next to, over, on, in the host pipe) and then monitor the pictures and/or video from the camera C to determine the size of the host pipe.

Referring to FIG. 3, to install an end seal S in a host pipe P to be lined using the end seal placement tool 10, the person removes the manhole cover MC to open the manhole M and gain access to the host pipe P located within the manhole. FIG. 3 shows the manhole cover MC removed from the manhole M and set off to the side. In other arrangements, the host pipe P may not be located within a manhole M and the person may gain access to the host pipe in other ways.

With the manhole M open, the person positions the end seal S within the host pipe P using the end seal placement tool 10. As shown in FIG. 3, the end seal placement tool 10 allows the person to install the end seal S in the host pipe P from a location that is outside of the manhole M. To load an end seal S into end seal placement tool 10, the person ensures the push plate 34 is in the initial position. With the push plate 34 in the initial position, the person loads an end seal S into the end seal holder 18. The person compresses to the end seal S so that it can fit within the end seal chamber 22 and slides (e.g., moves) the end seal into the end seal chamber (FIG. 1). Preferably, when the end seal S is loaded into the end seal holder 18, the entire end seal is disposed within the end seal chamber 22. Once in the end seal chamber 22, the person releases the end seal S and the retaining ring R of the end seal expands radially outward, pushing the hydrophilic material M against the exterior wall 24. This secures the end seal S in the end seal chamber 22. If the end seal S does not include a retaining ring R, a separate retaining ring (not shown) may be used. This separate retaining ring functions in the same way as retaining ring R, except that it is not incorporated into the end seal S. Other ways of securing the end seal S to the end seal placement tool 10 and/or the host pipe P are within the scope of the present disclosure. In such an embodiment, no retaining ring (e.g., retaining ring R or separate retaining ring) may be required.

After the end seal placement tool 10 is loaded with an end seal S, the person extends the end seal placement tool 10 into the manhole M, while the person remains outside of the manhole. Grasping the pole 12, the person maneuvers the end seal holder 18 to insert the distal end 26 of the end seal holder into the lumen L of the host pipe P. At this point, before the end seal S is launched, the person may take and/or confirm the measurement of the host pipe P using the pipe measurement assembly 50. Once the end seal holder 18 is inserted into the host pipe P, the end seal S is launched or ejected from the end seal holder 18 into the host pipe P. The person activates the launcher 20 to launch the end seal S by actuating the trigger 46. This ejects the end seal S from the end seal holder 18 and positions the end seal S within the lumen L of the host pipe P. Specifically, when the linear actuator 36 of the launcher 20 is activated via the trigger 46, the linear actuator moves the push plate 34 distally. As the push plate 34 moves distally, the push plate 34 engages and pushes the end seal S in the end seal chamber 22 distally as well. This continues until the push plate 34 has pushed the end seal S through the end seal opening 28 and into the lumber L of the host pipe P. In order to ensure the end seal S is positioned in the host pipe P, the linear actuator 36 may also move the push plate 35 through the end seal opening 28. Once in the lumen L of the host pipe P, the retaining ring R of the end seal expands radially outward, pushing the hydrophilic material M against the wall W of the host pipe, securing the end seal in the host pipe. After the end seal S is positioned in the host pipe P, the person can attach a camera to the camera mount of the end seal placement tool 10 to take pictures or video to confirm the installation and placement of the end seal within the host pipe. After the end seal S is positioned, a liner (not shown) can then be positioned in the host pipe P.

By using the end seal placement tool 10, a person can install an end seal S in a host pipe P without having to enter the manhole M. As a result, the person does not have to spend the considerable amount of time and energy it takes to enter a manhole M. In order to enter a manhole M, a person must set up a tripod, a winch, a secondary fall restraint in case the winch fails, a harness, a blower with a power supply (e.g., a generator), an air monitor (which is required to be tested daily) and receive a manhole permit from the local government office (which is used to document the manhole entry and has to be returned to the local office where it is kept on file for seven years). Setting all of this up in order to enter the manhole M takes a considerable amount of time and effort, even for a relatively short task (e.g., about 5 minutes) of a person entering the manhole and manually installing an end seal S in a host pipe P. The end seal placement tool 10 eliminates the need for all of this equipment and documentation, saving time and money.

Having described the disclosure in detail, it will be apparent that modifications and variations are possible without departing from the scope of the disclosure defined in the appended claims. For example, where specific dimensions are given, it is understood these dimensions are exemplary and other dimensions are possible.

When introducing elements of the present disclosure or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the disclosure are achieved and other advantageous results attained.

As various changes could be made in the above constructions, products, and methods without departing from the scope of the disclosure, it is intended that all matter contained in the above description and shown in the accompanying drawings shall be interpreted as illustrative and not in a limiting sense.

What is claimed is:

1. An end seal placement tool for placing an end seal in a host pipe within a manhole, the end seal placement tool comprising:
    a rigid pole with opposite proximal and distal ends;
    an end seal holder disposed at the distal end of the pole, the end seal holder including an end seal chamber configured to hold the end seal, the end seal holder sized and shaped to be at least partially inserted into the host pipe; and
    a launcher arranged with respect to the end seal holder for ejecting the end seal from the end seal holder into the host pipe.

2. The end seal placement tool of claim 1, wherein the pole has a length selected to permit a human standing adjacent to the manhole to hold the pole while positioning the end seal holder and launcher adjacent to the host pipe within the manhole.

3. The end seal placement tool of claim 2, wherein the end seal holder is pivotably attached to the pole.

4. The end seal placement tool of claim 3, further comprising a trigger located proximate the proximal end of the pole, the trigger being capable of activating the launcher to launch the end seal.

5. The end seal placement tool of claim 4, wherein the launcher comprises a push plate and a linear actuator operatively coupled to the push plate, wherein the linear actuator drives movement of the push plate to launch the end seal from the end seal holder.

6. The end seal placement tool of claim 5, wherein the linear actuator is a pneumatic linear actuator.

7. The end seal placement tool of claim 6, further comprising a valve, and wherein the trigger is operatively connected to the valve for actuating the valve to cause the pneumatic linear actuator to launch the end seal from the end seal holder.

8. The end seal placement tool of claim 5, wherein the push plate is configured to move distally through the end seal chamber to launch the end seal.

9. The end seal placement tool of claim 1, wherein the end seal holder includes an end seal opening in communication with the end seal chamber, the launcher being configured to launch the end seal from the end seal holder by moving the end seal through the end seal opening.

10. The end seal placement tool of claim 1, further comprising a mount on the end seal holder and measurement equipment connected to and supported by the mount for measuring dimensions of the host pipe.

11. The end seal placement tool of claim 1, in combination with the end seal.

12. A method of placing an end seal in a host pipe within a manhole, the method comprising:
    opening the manhole to gain access to the host pipe located within the manhole;
    loading an end seal into an end seal placement tool while outside of the manhole; and
    positioning the end seal placement tool loaded with the end seal within the host pipe from a location outside of the manhole while supporting the end seal placement tool and end seal from the location outside of the manhole.

13. The method of claim 12, wherein positioning the end seal includes placing the end seal placement tool into an end of the host pipe that opens into the manhole.

14. The method of claim 13, wherein using the end seal placement tool includes the worker extending the end seal placement tool into the manhole via a rigid pole of the end seal placement tool while the worker remains outside the manhole.

15. The method of claim 14, wherein positioning the end seal includes launching the end seal from an end seal holder of the end seal placement tool into the host pipe.

16. The method of claim 15, wherein launching the end seal includes activating a launcher to launch the end seal from the end seal holder.

17. The method of claim 16, wherein activating the launcher includes actuating, by the worker located outside of the manhole, a trigger to activate the launcher and launch the end seal from the end seal holder.

18. The method of claim 17, wherein positioning the end seal includes inserting, before launching the end seal from the end seal holder, the end seal holder into the host pipe.

19. The method of claim 14, further comprising measuring the host pipe using measuring equipment supported on the end seal placement tool.

20. The method of claim 13, further comprising positioning a liner, after positioning the end seal, in the host pipe.

* * * * *